United States Patent Office

3,014,069
Patented Dec. 19, 1961

3,014,069
MANUFACTURE OF ORGANIC ACIDS, ESTERS AND SALTS
David O. De Pree, Baton Rouge, La., assignor to Ethyl Corporation, New York, N.Y., a corporation of Delaware
No Drawing. Filed Sept. 8, 1958, Ser. No. 759,397
6 Claims. (Cl. 260—526)

This invention is concerned with the manufacture of sulfino acids and their esters and salts. In particular, it is concerned with the preparation of these materials by the reaction of sulfur dioxide with specific organometallic compounds.

It is, therefore, an object of this invention to provide a novel process for the manufacture of salts and esters of a sulfino acid and sulfinoacetic acid itself. A still further object of this invention is to provide a more economical and simplified process for the preparation of sulfino acids. A more specific object is to provide a process for the preparation of the sodium salt of sulfinoacetate by reacting α-sodio-sodium acetate with sulfur dioxide. These and other objects of this invention will be apparent from the description hereinafter.

The novel process of this invention comprises reacting α-metallo-metallic acetates containing two carbon atoms and wherein the metallic elements are selected from the group consisting of alkali and alkaline earth metals with sulfur dioxide.

The temperatures at which the reaction is conducted vary from between about 0 through 200° C. In most instances, however, it is preferred to employ temperatures from 25° C. through 140° C. inclusive. The temperature of reaction employed is preferably from about 120° C. to 200° C. and, more especially, from about 120° C. to about 160° C.

Thus, the process of this invention provides a new and direct method for the preparation of salts of sulfinoacetic acid. Such a preparation involves the reaction of α-sodio-sodium acetate with sulfur dioxide. The salts can be employed as such or readily converted to the acid or ester by acidification or esterification techniques.

The present invention will be more completely understood by reference to the following examples. In each instance, all parts and percentages are by weight unless otherwise specified.

*Example I*

α-Sodio-sodium acetate was prepared by reacting 2 moles of sodium amide with 2 moles of anhydrous sodium acetate in a nitrogen purged reaction vessel. A pre-blend of these materials in a charging vessel was continuously fed to the reactor at a rate such that with external heating, the temperature could be maintained between 185 and 235° C. The ammonia which was liberated was continuously withdrawn. The overall reaction required about 1 hour. The α-sodio-sodium acetate thus prepared was transferred to a glass vessel containing approximately 500 parts of mineral oil. Sulfur dioxide was slowly charged to the vessel. A reaction occurred with a rise in temperature. The vessel was heated to a temperature of 140°. There was no further reaction apparent by the fact that sulfur dioxide absorption had terminated. The vessel was cooled and the yellow product discharged, filtered, washed with hexanes and then dried. In such a manner, approximately 60 percent of the α-sodio-sodium acetate was converted to sodio sulfinoacetate.

*Example II*

By following the procedure of the preceding example with the exception that 19.1 parts of α-sodio sodium acetate suspended in Tetralin were continuously fed to the reactor while maintaining the temperature in the reactor between 150 and 160° C. with a total reaction time of 4 hours, disodium sulfinoacetate is obtained in high yield.

*Example III*

The procedure of Example I is followed with the exception that in this instance, a high pressure reactor was employed. When charging 10 parts of α-sodio-sodium acetate and maintaining the temperature at 120° C. with the sulfur dioxide atmosphere under pressure at 700 p.s.i.g., disodium sulfinoacetate is obtained in a similar yield after a reaction period of 5 hours although the reaction, from temperature and pressure observations, appears complete in 30 minutes.

*Example IV*

When α-lithio-lithium-acetate is reacted with sulfur dioxide essentially as described in Example I, dilithium sulfinoacetate is obtained in high yield.

*Example V*

When α-calcio-sodium acetate is reacted with sulfur dioxide at a temperature of 200° C. and atmospheric pressure, it becomes necessary to utilize a short reaction period. Thus, the reaction is conducted for a period of ½ minute and sodium calcium sulfuroacetate is thereby obtained in high yield.

The foregoing examples are presented merely as typical illustrations of the process of the present invention and it is not intended that the invention be limited thereby.

The α-metallo-metallic acetates are compounds containing two carbon atoms in which the metallic elements are selected from the group consisting of alkali and alkaline earth metals. These compounds can be depicted by the following structural formula:

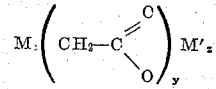

wherein M and M' can be the same or different and are alkali or alkaline earth metals and $x$, $y$, and $z$ are small whole numbers dependent upon the valence of M and M'. The alkali metals are intended to include the metals of group I of the periodic chart of the elements. Likewise, the alkaline earth metals include the metals of group II-A of the periodic chart as set forth in the Handbook of Chemistry and Physics, 35th ed., Chemical Rubber Publishing Co., at page 392. Thus, among the compounds thereby described which can be substituted for the α-metallo-metallic acetate employed in the preceding examples are included α-sodio-potassium acetate, α-lithio-potassium acetate, α-potassio-potassium acetate, α-sodio-calcium acetate, α-lithio-barium acetate, α-calcio-sodium acetate, α-bario-cerous acetate, and the like wherein the other alkali and alkaline earth metals are substituted for the metals named hereinbefore.

In general, pressure is not required to conduct the process of this invention. However, as indicated in Example III, higher pressures can be employed to accelerate the reaction to a certain degree. In general, pressures of atmospheric and higher can be employed. Ordinarily, the pressure will be between about atmospheric and 1500 p.s.i.g. For more economical operation but with rapid reaction rate, it is preferred to employ a pressure between about atmospheric and 1000 p.s.i.g. Thus, any of the aforementioned examples can be repeated employing pressures of 10, 40, 50, 100, 500, and 1000 p.s.i.g. to produce similar results.

The proportions of the reactants are not critical and, in general, are determined by the take-up of the sulfur dioxide by the α-metallo-metallic acetate. Hence, all that is basically required is to maintain an atmosphere of the sulfur dioxide present in the reactor employed. Thus, an excess of the sulfur dioxide is used but such excess is readily recovered and reused.

The reaction time is generally determined by the rate of consumption of the sulfur dioxide under the conditions of reaction. Hence, when it is evident that no more sulfur dioxide is being consumed in reaction, the reaction is complete. Ordinarily, the reaction time required will vary from about ½ minute to 10 hours. It is preferred, however, to employ a reaction period of between ½ minute to 5 hours. If the temperature of the reaction is above about 200° C., the reaction is preferably terminated within about 2 hours in order to avoid decomposition of the product.

Although not required, it is sometimes advantageous to employ a diluent when conducting the reaction. For example, the α-metallo-metallic acetate can be suspended in any essentially inert organic diluent which is liquid under the reaction conditions. For such purpose, the hydrocarbons and ethers can be employed, generally those containing less than 18 carbon atoms. Typical examples of such diluents include the pentanes, hexanes, nonanes, and the like up to and including octadecane; benzene, toluene, Tetralin, mineral oil, gasoline and the like; and ethers such as diamyl ether, dimethyl ether of ethylene glycol and diethylene glycol, dioxane, tetrahydrofuran and the like. The hydrocarbon diluents are particularly preferred because of their lesser reactivity and greater availability.

The metal salt of the sulfino acid as directly prepared in the reaction can be employed without further purification. In order to convert it to the pure acid, which is a particularly preferred embodiment of this invention, it is dissolved in water, then acidified with an inorganic acid such as hydrochloric, sulfuric, phosphoric, and the like acids. The acid is then extracted from the water solution with suitable extractants. It should be noted that care must be taken to avoid auto oxidation of the product acid. For this process, the various ethers and esters can be employed. Typical examples of such are diethyl ether, dimethyl ether, the methyl and ethyl ethers of ethylene glycol and diethylene glycol, methyl acetate, isopropyl acetate, propyl acetate, amyl acetate, methyl propionate and the butyrates, caproates, and the like. Isopropyl acetate has been found to be particularly suitable. The extractant is then distilled from the sulfino acid.

A still further method for recovering the acid value is to esterify the metal salt obtained from the reaction with esterifying agents such as alkyl sulfates and halides. This procedure is particularly preferred since it results in the corresponding ester of the pure acid. Further, it is a more practical and efficient method for recovering the pure acid value, in view of the reactivity of this ester in water-acid solutions. Typical such esterifying materials include dimethyl, diethyl, dipropyl, dibutyl, and the like alkyl sulfates; and the alkyl halides such as methyl, ethyl, butyl, propyl, amyl, hexyl, and the like chlorides, bromides, and iodides having up to about 8 carbon atoms. A typical example of this method of utilization of disodium salt of sulfinoacetic acid as prepared in Example I is as follows.

*Example VI*

One hundred forty-eight parts of disodium sulfinoacetate are suspended in 800 parts of xylene. The mixture is heated to the reflux temperature. Then 252 parts of dimethyl sulfate are added slowly. The mixture is maintained at this temperature for about 3 hours, then filtered to remove the sulfate salt. The dimethyl ester of sulfinoacetic acid is recovered from the xylene in high yield by vacuum distillation.

As noted in the preceding example, two moles of the sulfate are employed per mole of the disodium sulfinoacetate. In general, between about 1 to 3 moles of the esterifying reagent are employed per mole of the acid salt. When higher temperatures, as between 140 to 200° C., are employed in place of the temperature in the preceding example, generally between about 1 and 2 moles of the esterifying reagent are sufficient. On the other hand, when alkyl halides are employed in place of the sulfates, it is preferred to use between about 2 to 3 moles thereof per mole of the acetate salt at a temperature between about 140 to 200° C., generally in a closed system or under pressure.

The product produced according to this invention is of considerable utility as a chemical intermediate in the production of, for example, detergents, polymers, etc. Reference to the full working example more fully illustrates the employment of disodium sulfinoacetate in the preparation of a detergent.

*Example VII*

16.8 parts of disodium sulfinoacetate produced in a manner similar to that set forth in Example I are added to a reaction container. To the reaction container is added 9.8 parts of sulfuric acid as a 50 percent solution in water. In such manner, sulfinoacetic acid is obtained. Thereafter, the reaction mass is air blown in order to oxidize the acid to the sulfinoacetic acid derivate. The system is neutralized to a slightly alkaline state with sodium hydroxide and thereafter the acid precipitate is thereafter filtered off and suspended in 16.1 parts of dodecyl alcohol and 100 parts of toluene. Thereafter anhydrous hydrogen chloride is added to the reaction mass in order to convert the salt to the free acid. The reaction mixture is then heated to reflux temperature. The water produced in the esterification step is taken off by azeotropic distillation. Sulfonic acid ester is separated off and thereafter treated with 40 parts of sodium hydroxide in 500 parts of water. The water is removed by evaporation so as to obtain the desired sodium sulfonate ester.

By varying the starting sulfinoacetate in Example VII, other metallic sulfonate esters can be prepared. For example, the potassium sulfonate ester is prepared from the dipotassium sulfinoacetate, the rubidium sulfonate ester from the dirubidium sulfinoacetate, the cesium sulfonate ester from the dicesium sulfinoacetate, the beryllium sulfonate ester with the diberyllium sulfinoacetate, the magnesium ester from the dimagnesium sulfinoacetate, the strontium ester from the distrontium sulfinoacetate, the barium ester from the dibarium sulfinoacetate and so on.

Other utilities of the compositions produced in this invention will become evident to those skilled in the art.

Having thus described the process of this invention, it is not intended that it be limited except as set forth in the appended claims.

I claim:

1. A process for the preparation of metal salts of a sulfino acid which comprises reacting an α-metallometallic acetate containing two carbon atoms with sulfur dioxide; said process being conducted at a temperature ranging from about 120° to about 200° C.; said metal, said metallo and said metallic elements being selected from the class consisting of alkali and alkaline earth metals.

2. A process for the preparation of alkali metal salts of a sulfino acid which comprises reacting an α-alkali metallo alkali metallic acetate, containing two carbon atoms, with sulfur dioxide, at a temperature ranging from about 120° to about 160° C.; said process being carried out in an essentially inert organic diluent, which is liquid under the reaction conditions.

3. A process for the preparation of alkali metal salts of a sulfino acid which comprises reacting an α-alkali metallo alkali metallic acetate, containing two carbon atoms, with sulfur dioxide, at a temperature ranging from about 120 to about 160° C.; said process being carried out in the absence of diluents.

4. A process for the preparation of disodium sulfino acetate which comprises reacting α-sodio-sodium acetate with sulfur dioxide at a temperature ranging from about 140° to about 160° C., said process being conducted in a hydrocarbon diluent, containing up to about 18 carbon atoms, and which is liquid under the reaction conditions.

5. A process for the preparation of the disodium salt of sulfino acetate which comprises reacting α-sodio-sodium acetate with sulfur dioxide in mineral oil at a temperature of about 140° C.

6. A process for the preparation of the disodium salt of sulfino acetate which comprises reacting α-sodio-sodium acetate with sulfur dioxide at a temperature ranging from about 150° to about 160° C., said process being carried out in Tetralin.

References Cited in the file of this patent

Truce et al.: Chemical Reviews, vol. 48, pp. 83–86 (1951).

Truce et al.: Chemical Reviews, vol. 73, pp. 126–128 (1951).